US012716547B2

(12) United States Patent
Al-Anazi et al.

(10) Patent No.: US 12,716,547 B2
(45) Date of Patent: Aug. 25, 2026

(54) PERMANENT, COMPACT, ONLINE MONITORING AND CONTROLLED AUTOMATION SYSTEM

(71) Applicant: SAUDI ARABIAN OIL COMPANY, Dhahran (SA)

(72) Inventors: Ammal F. Al-Anazi, Dammam (SA); James O. Arukhe, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 72 days.

(21) Appl. No.: 18/545,442

(22) Filed: Dec. 19, 2023

(65) Prior Publication Data

US 2025/0198566 A1 Jun. 19, 2025

(51) Int. Cl.
*F16N 29/02* (2006.01)
*E21B 34/02* (2006.01)
(Continued)

(52) U.S. Cl.
CPC .............. *F16N 29/02* (2013.01); *E21B 34/02* (2013.01); *E21B 34/16* (2013.01); *E21B 44/00* (2013.01);
(Continued)

(58) Field of Classification Search
CPC ................................ F16N 29/02; F16N 29/04
See application file for complete search history.

(56) References Cited

U.S. PATENT DOCUMENTS 5,823,295 A * 10/1998 Griffith ................... F16N 7/385 184/6
8,220,553 B2 * 7/2012 Crawford ................ E21B 33/08 166/368
(Continued)

FOREIGN PATENT DOCUMENTS

CN 109312869 B 2/2021
KR 102214572 * 2/2021 ............. F16N 17/32
WO 2019140459 A1 7/2019

OTHER PUBLICATIONS

Al Khamis et al., "A Comprehensive Approach of Well Integrity Surveillance." Paper presented at the International Petroleum Technology Conference, Doha, Qatar, Jan. 2014, 11 pages.
(Continued)

*Primary Examiner* — Blake Michener
(74) *Attorney, Agent, or Firm* — Osha Bergman Watanabe & Burton LLP

(57) ABSTRACT

System and method for a permanent monitoring and control automation system for a well includes a grease tank including a storage container configured to hold grease, sensors for measuring grease volume in the grease tank and pressure levels, and a pump for greasing a valve at a pre-set pressure level value using grease from the grease tank. The system further includes a greasing control system for monitoring parameters, inputting parameters into an artificial intelligence model, determining pumping rate, volume, and time schedule, predicting a greasing maintenance schedule, and pumping grease. The greasing control system includes a
(Continued)

computer processor connected to a remote terminal unit and a supervisory control and data acquisition. The system further includes an alert system for transmitting alarms to notify a user of system status. The alarms include low grease level on the valve, operational status, alert type, system malfunction, and grease tank low level.

16 Claims, 5 Drawing Sheets

(51) Int. Cl.
*E21B 34/16* (2006.01)
*E21B 44/00* (2006.01)
*F16N 11/08* (2006.01)
*F16N 29/04* (2006.01)
*F16N 13/00* (2006.01)

(52) U.S. Cl.
CPC .............. *F16N 11/08* (2013.01); *F16N 29/04* (2013.01); *E21B 2200/22* (2020.05); *F16N 13/00* (2013.01)

(56) References Cited

U.S. PATENT DOCUMENTS 9,605,506 B1 * 3/2017 Jameson ............... F16N 19/006
10,100,978 B2 * 10/2018 Gouge .................... F16N 11/00
10,260,327 B2 4/2019 Kajaria et al.
10,436,766 B1 * 10/2019 Bayyouk ................. F04B 17/05
11,137,109 B2 * 10/2021 Babineaux .............. F16N 11/08
11,814,939 B2 * 11/2023 Viator ..................... E21B 34/02
12,000,240 B2 * 6/2024 Cain ................... E21B 43/2607
2012/0223813 A1 * 9/2012 Baxter .................... E21B 44/00
340/10.1
2014/0238742 A1 * 8/2014 Borek ...................... F01M 1/16
175/227
2017/0038003 A1 * 2/2017 Conley ................... F16N 7/385
2017/0276293 A1 * 9/2017 McKim ................... F16N 21/00
2017/0336022 A1 * 11/2017 Gouge .................... F16N 7/385
2019/0219225 A1 * 7/2019 Beason ................... F16N 29/02
2019/0360637 A1 * 11/2019 McKim ................... F16N 13/22
2020/0309319 A1 * 10/2020 Pitcher .................... F16N 29/02
2020/0347990 A1 * 11/2020 McKim ................... F16N 25/00
2020/0355321 A1 * 11/2020 Zerkus .................... F16N 7/385
2021/0262315 A1 * 8/2021 Beason ................... E21B 34/02
2022/0290547 A1 9/2022 Viator et al.

OTHER PUBLICATIONS

Al-Mukhaitah et al., “Effective Well Integrity Management in a Mature Sour Oil Field.” Paper presented at the International Petroleum Technology Conference, Beijing, China, Mar. 2013, 8 pages.

* cited by examiner

PERMANENT, COMPACT, ONLINE MONITORING AND CONTROLLED AUTOMATION SYSTEM

BACKGROUND

In the oil and gas industry, it is common that, despite documentation, Christmas tree, and wellhead valves show signs of poor upkeep. Poorly kept valves lead to operational challenges and costly shutdowns. The valves are crucial for the well functioning efficiency. Current methods include valve lubrication consisting of manual operation and scheduling. The current methods often encounter potential oversight and delays.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a permanent monitoring and control automation system for a well, the system comprising: a grease tank comprising a storage container configured to hold grease; a plurality of sensors configured to measure a volume of grease in the grease tank and a pressure level; a pump configured to grease a valve on the well at a pre-set value of the pressure level using grease from the grease tank; a greasing control system communicably connected to the grease tank, the plurality of sensors, and the pump, the greasing control system comprising a computer processor connected to a remote terminal unit (RTU) and a supervisory control and data acquisition (SCADA), wherein the greasing control system is configured to monitor, by the computer processor, a plurality of parameters comprising the volume of grease, a valve greasing status, and an operational efficiency status of the valve; input, via the computer processor, the plurality of parameters into an artificial intelligence model; determine, via the computer processor, a pumping rate, a pumping volume, and a pumping time schedule based, at least in part, on the plurality of parameters; predict, via the computer processor and the artificial intelligence model, a greasing and maintenance schedule; and pump, via the pump, grease from the grease tank based, at least in part, on the greasing and maintenance schedule; and an alert system disposed in the greasing control system configured to transmit an alarm to notify a user of a system status, wherein the system status comprises a low grease level on the valve, an operational status, an alert type, a system malfunction, and a grease tank low level.

In one aspect, embodiments disclosed herein relate to a method for a permanent monitoring and control automation system for a well, the method comprising: storing grease in a grease tank comprising a storage container; measuring, via a plurality of sensors, a volume of grease in the grease tank and a pressure level; communicably connecting a greasing control system to the grease tank, the plurality of sensors, and a pump, the greasing control system comprising a computer processor connected to a remote terminal unit (RTU) and a supervisory control and data acquisition (SCADA), wherein the greasing control system performs a method comprising: monitoring, by the computer processor, a plurality of parameters comprising the volume of grease, a greasing status of a valve on the well, and an operational efficiency status of the valve; inputting, via the computer processor, the plurality of parameters into an artificial intelligence model; determining, via the computer processor, a pumping rate, a pumping volume, and a pumping time schedule based, at least in part, on the plurality of parameters; predicting, via the computer processor and the artificial intelligence model, a greasing and maintenance schedule; and pumping, via the pump, grease from the grease tank based, at least in part, on the greasing and maintenance schedule comprising a pre-set value of the pressure level; greasing, via the pump, the valve on the well based on the greasing and maintenance schedule using grease from the grease tank; and transmitting, via an alert system disposed in the greasing control system, an alarm to notify a user of a system status, wherein the system status comprises a low grease level on the valve, an operational status, an alert type, a system malfunction, and a grease tank low level.

Other aspects and advantages of the claimed subject matter will be apparent from the following description and the appended claims.

DETAILED DESCRIPTION

Figure 1:
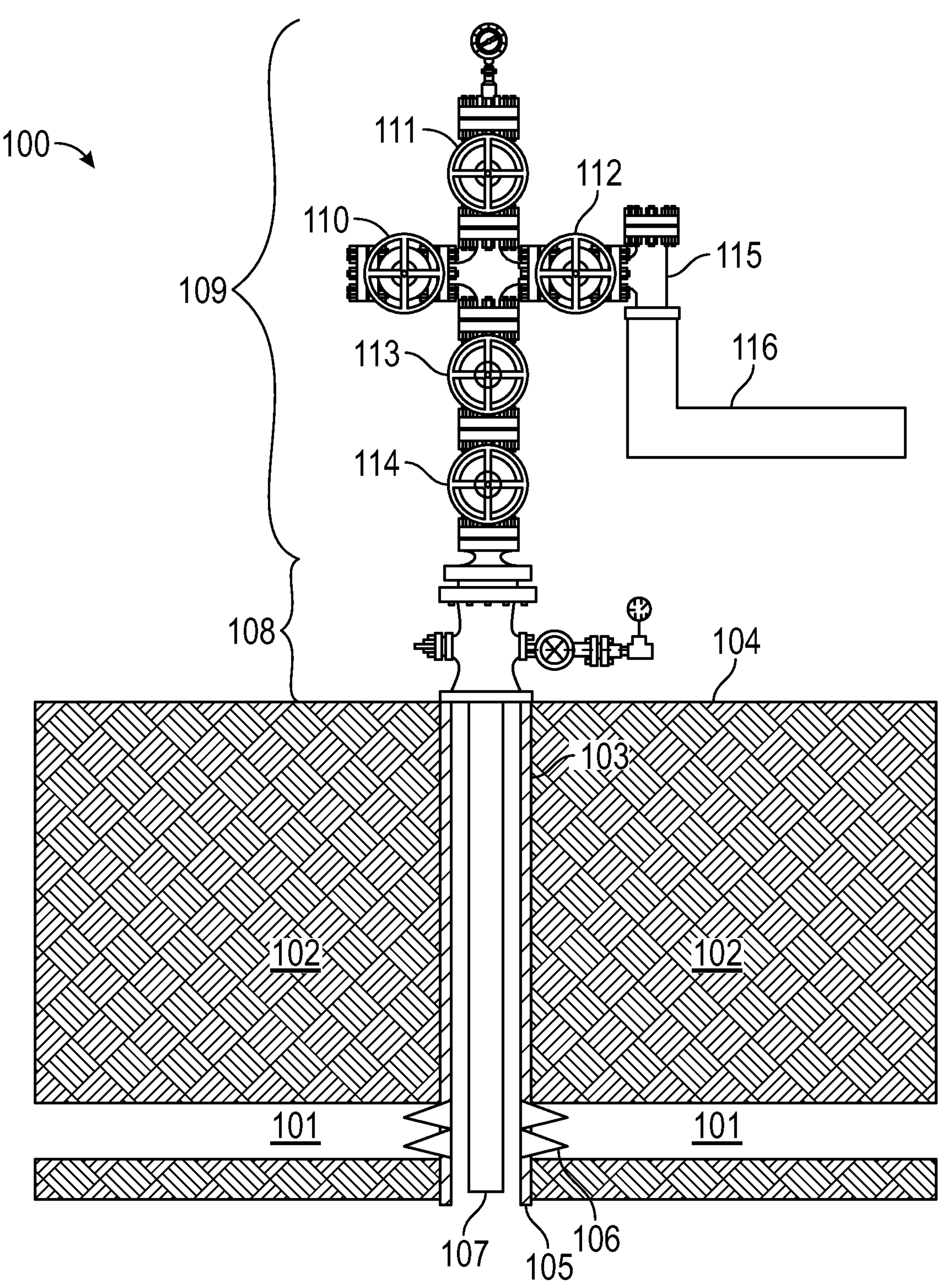
FIG. 1 shows a well system in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-5, any component described regarding a figure, in various embodiments disclosed herein, may be equivalent to one or more like-named components described with regard to any other figure. For brevity, descriptions of these components will not be repeated regarding each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a force applicator" includes reference to one or more of such force applicators.

In one aspect, embodiments disclosed herein relate to a permanent monitoring and control automation system for a well. The permanent monitoring and control automation system provides automated lubrication of wellhead and Christmas tree valves using grease and artificial intelligence. Throughout this disclosure, wellhead valves and Christmas tree valves may be referred to as "valves." Valves are crucial for the smooth functioning of wells. Poorly kept valves are difficult to operate, especially when valve stems disengage from wheels. Valves are commonly greased timely and according to a manufacturer's schedule.

Embodiments of the present disclosure may provide at least one of the following advantages. The permanent monitoring and control automation system significantly reduces operational challenges and costly shutdowns caused by poor upkeep of valves. The permanent monitoring and control automation system ensures Christmas tree and wellhead integrity and minimizes human intervention. Field personnel only need to intervene for tasks such as refilling a grease tank, maintaining a pump, or ensuring the smooth operation of the integrated system. Minimizing human intervention reduces human error, workplace accidents, and environmental incidents fostering a safer work environment. Especially beneficial for offshore operations, the system increases reliability by curtailing logistics-related delays from external factors such as weather or logistical constraints. The system is compact and may be specifically tailored to accommodate a small footprint on offshore platforms. The system may be catered to various well types including oil, water, and gas wells, whether the well is active, suspended, or explored.

The permanent monitoring and control automation system may demonstrate high energy efficiency and reduce overall operational carbon footprint and contribute to environmental sustainability. The system may be integrated into existing infrastructures to reduce time and cost of implementation. The permanent monitoring and control automation system may be integrated into many industries including construction, mining, agriculture, manufacturing, oil and gas, wind turbines, marines, railways, automotive, food processing, pulp and paper, steel and metal, water and wastewater treatment, and power plants.

FIG. 1 shows a well system (100) in accordance with one or more embodiments. Fluids produced from a hydrocarbon reservoir may include natural gas, oil, and water. In the oil and gas industry, as illustrated in FIG. 1, the fluids are produced from a reservoir (101) in a formation (102) by drilling a wellbore (103) (also referred to as "well") into the formation (102), establishing a flow path between the reservoir (101) and the wellbore (103), and conveying the fluids from the reservoir (101) to a surface (104) through the wellbore (103). A casing (105) may be installed in wellbore (103). In some embodiments, the casing (105) may be perforated to have perforations (106) into the reservoir (101) to allow a flow of the fluids to enter the wellbore (103). Typically, a production tubing (107) is disposed in the wellbore (103) to carry the fluids to the surface (104). The production tubing (107) hangs from a wellhead (108) at the surface (104). The production tubing (107) extends past the reservoir (101), thereby forming a flow conduit from the reservoir (101) to surface (104).

A tree structure, also known as a "Christmas tree" (109), is disposed on top of the wellhead (108) to control the flow of fluids into or out of the wellbore (103), depending on whether it is an injection well or a production well. The Christmas tree (109) includes a configuration of valves to control the fluids being injected into or pumped out of the wellbore (103). For example, the Christmas tree (109) may have an injection wing valve (110), a swab valve (111), a production wing valve (112), an upper master valve (113), and a lower master valve (114).

When an operator is ready to conduct well operations the valves (110, 111, 112, 113, 114) are either opened or closed to control the fluids being injected into or pumped out of the wellbore (103). During injection, the production wing valve (112) and the swab valve (111) are closed while the injection wing valve (110), the upper master valve (113), and the lower master valve (114) are open to allow for fluids to be injected through the Christmas tree (109) and into the wellbore (103). The wellbore (103) may include any well completion design, such as vertical, deviated, or varied orientation. During production, the injection wing valve (110) and the swab valve (111) are closed while the production wing valve (112), the upper master valve (113), and the lower master valve (114) are open to control or isolate fluid flow through a choke valve (115). From the choke valve (115), the fluids are transported, via a production flow line (116), to a production storage, transport, or facility.

The choke valve (115) is a mechanical device to control flow rates and pressure drops of the produced fluids. For example, an operational function of the choke valve (115) is to produce the fluids from the wellbore (103) at the desired rates by the introduction of human intervention to manually control the drawdown pressure. A choke size of the choke valve (115) is changeable to allow for the operator to adjust the amount of pressure dropped across the choke valve (115) in order to maintain a downstream pressure in the production flow line (116) at the desirable value which will lead to achieving the desirable rate.

Figure 2:
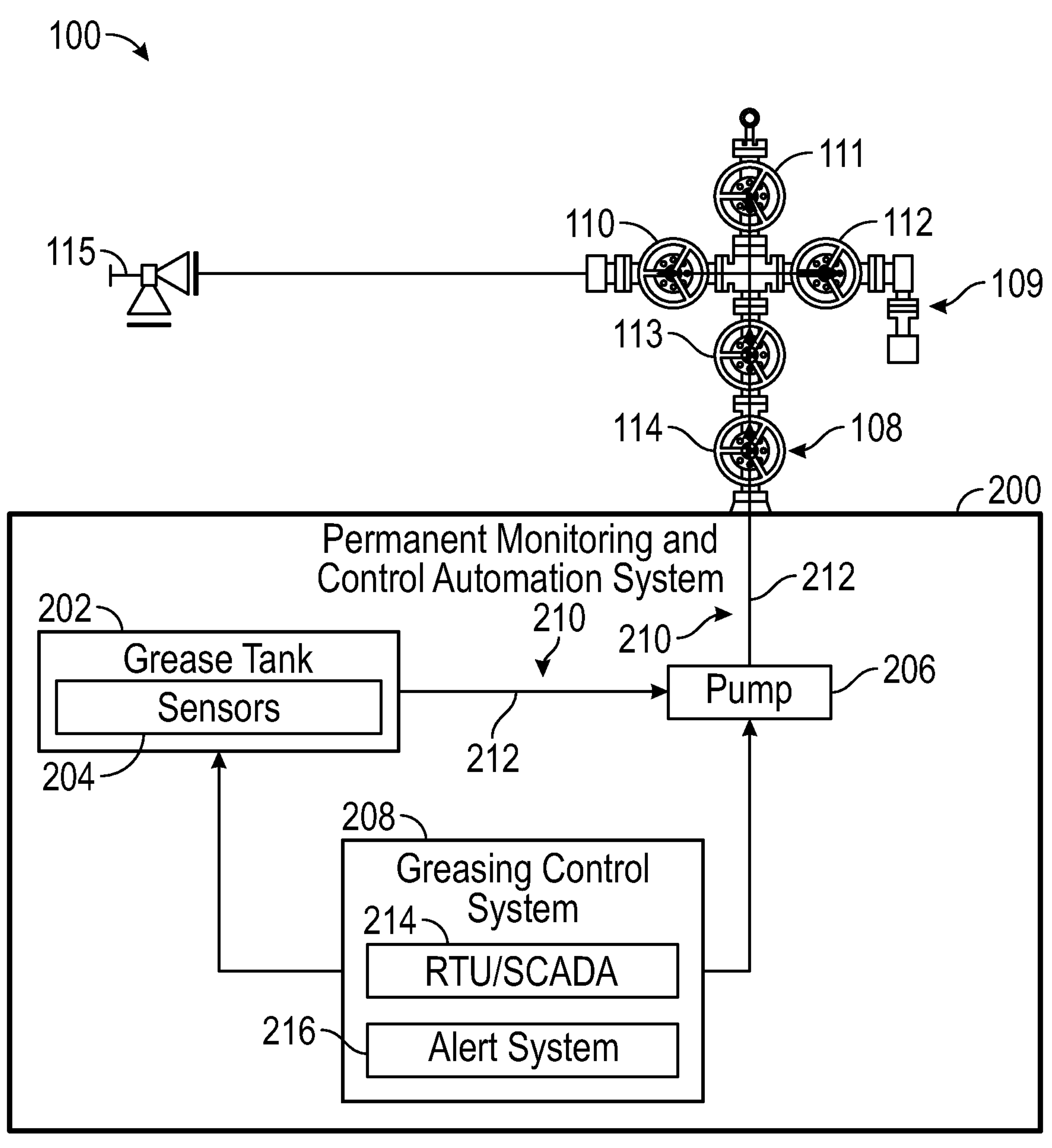
FIG. 2 shows a permanent monitoring and control automation system used in conjunction with FIG. 1 in accordance with one or more embodiments.

FIG. 2 shows a permanent monitoring and control automation system (200) in accordance with one or more embodiments. The permanent monitoring and control automation system (200) may be implemented in a well system (100) that may include a wellhead (108) and/or Christmas tree (109), as described in FIG. 1. One or more valves (110, 111, 112, 113, 114, 115) may be disposed on the wellhead (108) and/or Christmas tree (109). A person of ordinary skill in the art would appreciate that the valve may be any valve located on a wellhead (108) or Christmas tree (109) such as but not limited to a swab valve (111), a production wing valve (112), an injection wing valve (110), a upper master valve (113), a lower master valve (114), and/or a choke valve (115). Additional valves not illustrated in FIG. 2 may include a crown valve and a surface safety valve.

The permanent monitoring and control automation system (200) includes a grease tank (202), sensors (204), a pump (206), a greasing control system (208) installed permanently at the site of a well system (100). The grease tank (202), sensors (204), pump (206), and greasing control system (208) are designed for durability and resistance to harsh environments encountered in oil and gas sites and for easy installation, maintenance, and scalability. The grease tank (202) includes a storage container to hold grease (210). The grease tank (202) may be made of a corrosion-resistant material. A person of ordinary skill in the art may appreciate that the grease (210) may be any type of lubricant used in the industry to lubricate valves. The sensors (204) may be located on the grease tank (202). The sensors (204) measure grease volume in the grease tank (202) and pressure level. The sensors (204) may include an environmental monitoring sensor for detecting a leak in the valve. The environmental monitoring sensor may be utilized as a gas detector, a ph sensor, a turbidity sensor, a thermal camera, a sound level meter, a particulate matter sensor, an energy meter, and/or a waste level sensor. In some embodiments, sensors (204) detect grease volume pumped during greasing cycles. In one or more embodiments, a level sensor may be used to monitor optimal grease levels on the grease tank (202) and check whether the grease tank (202) is full.

In one or more embodiments, the valves are equipped with a smart tagging device, such as a radio-frequency identification tag or a near field communication tag. The smart tagging device may store detailed information about the valve including history, maintenance records, and specifications.

The pump (206) may be any mechanical device designed to pump grease (210) from the grease tank (202) to the valves under high pressure. The pump (206) may be a high-pressure pump. The pump (206) may be connected to the grease tank (202) and valves through pipelines (212) or control lines for direct delivery of grease (210). The pump (206) greases the valves using grease (210) from the grease tank (202). The pump (206) delivers grease (210) to valves under varying pressure conditions. A person skilled in the art may appreciate that the pump (206) is designed to be compatible with various types of greases (210) and lubricants suitable for different valve materials. The greasing control system (208) is communicably connected to the grease tank (202), the sensors (204), and the pump (206) and control each component.

Figure 5:
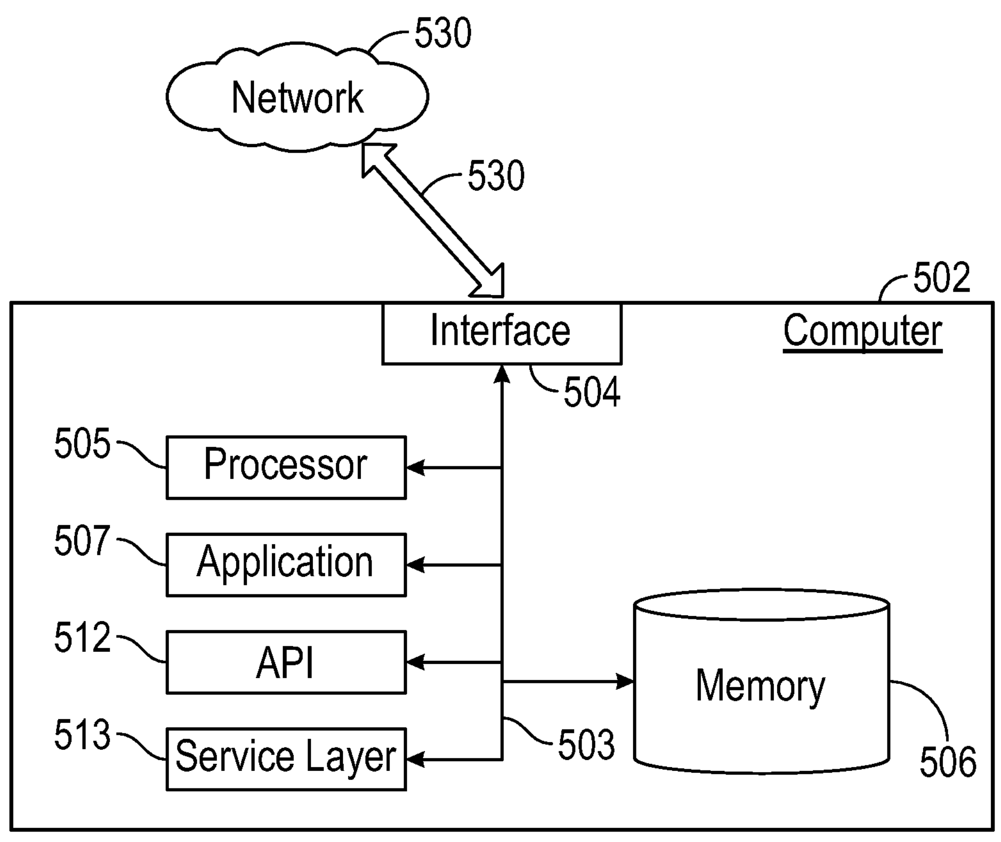
FIG. 5 shows a computer system in accordance with one or more embodiments.

The greasing control system (208) includes a computer processor (e.g., computer system (502)) as described further in FIG. 5. The greasing control system (208) may be considered as "the brain" of the permanent monitoring and control automation system (200) and act as a central logic system. The greasing control system (208) is connected to a remote terminal unit (RTU) and a supervisory control and data acquisition (SCADA) (214) for remote monitoring and data collection. The RTU and SCADA (214) may be used for centralized control and monitoring. Monitoring may include online greasing storage monitoring. Logic and programming may be used by the greasing control system (208) to dictate when and how the greasing should occur. For example, the greasing control system (208) actuates the pump (206) to deliver grease (210) automatically using a pre-set greasing schedule.

The greasing control system (208) may monitor greasing frequency of each valve. Scheduling greasing and monitoring greasing frequency allows for both online and offline greasing without interrupting well production. Integration of RTU and SCADA (214) enhances efficiency and oversight of the greasing schedules. RTU integration may be deployed at various points, particularly at valve locations, to collect data from sensors (204), execute control commands, and communicate with the SCADA system. The SCADA system may receive collected data from any RTU, process the data, and provide a comprehensive overview of the data. The SCADA system may send control commands to the RTUs based on the processed data.

For example, the greasing control system (208) monitors parameter data such as grease volume, valve greasing status, and valve operational efficiency status. In one or more embodiments, the greasing control system (208) determines pumping rate, volume, and timing based on pre-set requirements and parameters. The greasing control system (208) predicts a greasing and maintenance schedule and greases the valves via the pump (206) using artificial intelligence. The greasing and maintenance schedule may include optimized greasing schedules based on historical data and predictive maintenance needs. In some embodiments, the greasing and maintenance schedule ensures that the valves are greased at intervals specified by a manufacturer, such as every three or six months. The greasing and maintenance schedule may include greasing times and/or greasing volumes.

The greasing control system (208) includes an alert system (216) for transmitting alarms to notify a user of system status. System status includes low grease level, operational status, alert types, system malfunctions, and grease tank low level. System status may further include any leaks, pressure drops, malfunctions, or cycle count discrepancies. Cycle count discrepancies may include any deviation in actual greasing cycle counts, strokes or rotations, from the expected greasing cycle counts. The alert system (216) may prompt personnel when the grease tank level is low by displaying a grease tank low level alarm to refill the grease tank (202). The alert system (216) may be equipped with visual indicators, such as LED lights or on-screen indicators, for transmitting alarms. The alert system (216) may be equipped with audible alarms, such as sounds or beeps, that activate when an alarm is transmitted. The alert system (216) may be equipped with email notifications, SMS alerts, or digital application notifications for notification purposes. The thresholds or pre-set criteria for the alert system (216) may be customized by a user based on specific operational needs. A user may choose which types of alarms to receive by the alert system (216) and how to receive them. In some embodiments, the alert system (216) generates alerts for deviations in greasing times or volumes. The greasing control system (208) may then address the alert or alarm within a specified response time, such as changing the greasing and maintenance schedule, initiating a greasing cycle, or shutdown a valve automatically.

In some embodiments, the sensors (204) detect grease volume pumped during each grease cycle. The greasing control system (208) may then compare the detected grease volume with a preset volume. The comparison may be used for predicting a greasing and maintenance schedule and/or for obtaining system status. The greasing control system (208) may schedule greasing times, pump a preset volume of grease (210), and monitor actual greasing times and volumes, both online and offline. In such instances when the greasing control system (208) is offline, various strategies may be employed to mitigate disruption in monitoring. For example, local data storage continues to collect and store data locally to be uploaded for analysis when the greasing control system (208) is back online. A backup power supply may be implemented to keep the system operational during power outages using batteries or generators. Multiple communication channels, such as cellular, satellite, or radio, may be used to maintain a connection for data transmission in case the primary communication method fails. In such instances where the greasing control system (208) is offline for an extended period of time, an operator may periodically check system status and manually collect data. The greasing control system (208) may be programmed to predict potential failures or issues that may cause the system to go offline. The program may alert operators in advance to take preventive measures.

A person of ordinary skill in the art would appreciate that edge computing, full-safe modes, and regular system checks and maintenance may also be implemented. Edge computing involves data processing at the site, rather than relying on a central server, allowing data processing to continue even if the connection to the central server is lost. In the event of going offline, fail-safe modes automatically switches to a safe operational state, such as shutting down operations or low-power mode.

In one or more embodiments, the greasing control system (208) may be equipped with a feedback mechanism for collecting and analyzing feedback from field operators or maintenance teams for continuous improvement. The greasing control system (208) may include a cost-benefit analysis program to compare operational costs before and after implementation of the permanent monitoring and control automation system (200). The permanent monitoring and control automation system (200) may extend the lifespan of the well machinery and offer increased long-term cost savings.

In some embodiments, the greasing control system (208) is capable of creating a digital twin of one or more physical valves. This virtual representation may be constantly updated with real-time data to achieve comprehensive understanding of each valve's condition and performance. The greasing control system (208) may also include a location-based service utilizing global positioning system (GPS) or indoor positioning systems. The location-based service may pinpoint the exact location of each valve. In complex industrial setups, locating a specific valve may be challenging without a location-based service.

In some embodiments, the greasing control system (208) includes blockchain integration for secure data logging and traceability. The block chain network may be private, public, or consortium. The block chain integration logs all alarms and responses from the alert system (216) for auditing and improvement purposes. The data logged may be encrypted. Documentation may aid in identifying recurring issues and in refining the permanent monitoring and control automation system (200). The data logged is immutable and tamper-proof enhancing data security and resistance to unauthorized alterations. The blockchain integration may include decentralized data management. The decentralized nature eliminates single points of failure, meaning if one node in the network fails or is attacked, the data is not compromised.

In one or more embodiments, the permanent monitoring and control automation system (200) includes a community engagement platform integrated with the greasing control system (208) to emphasize user engagement. The greasing control system (208) and the alert system (216) are designed with a user-centric approach to provide an intuitive interface which empowers a user to make informed decisions as discussed above. The community engagement platform includes training modules and interactive guides for fostering a deeper understanding of the operation and maintenance of the permanent monitoring and control automation system (200). The platform includes community involvement and transparency, environmental stewardship and awareness, collaborative problem-solving and innovation, and safety and health advocacy. Operational data may be shared with local communities for communication purposes. Environmental stewardship and awareness involves environmental impact reports and assessments, engaging users and communities in discussions about sustainable practices.

In one or more embodiments, greasing control system (208) is integrated with an augmented reality (AR) support for providing maintenance and troubleshooting tools. The AR technology superimposes digital data onto physical surroundings. Thereby enriching a user's view of the actual environment. Key benefits in using AR support includes interactive troubleshooting, real-time data visualization, remote assistance, training and education, safety enhancements, and efficiency improvement. AR support may provide interactive guides, overlaying step-by-step instructions onto the physical equipment to simplify complex maintenance tasks. By providing visual guidance, AR support reduces time taken to diagnose and fix issues thereby improving overall operational efficiency.

Figure 3:
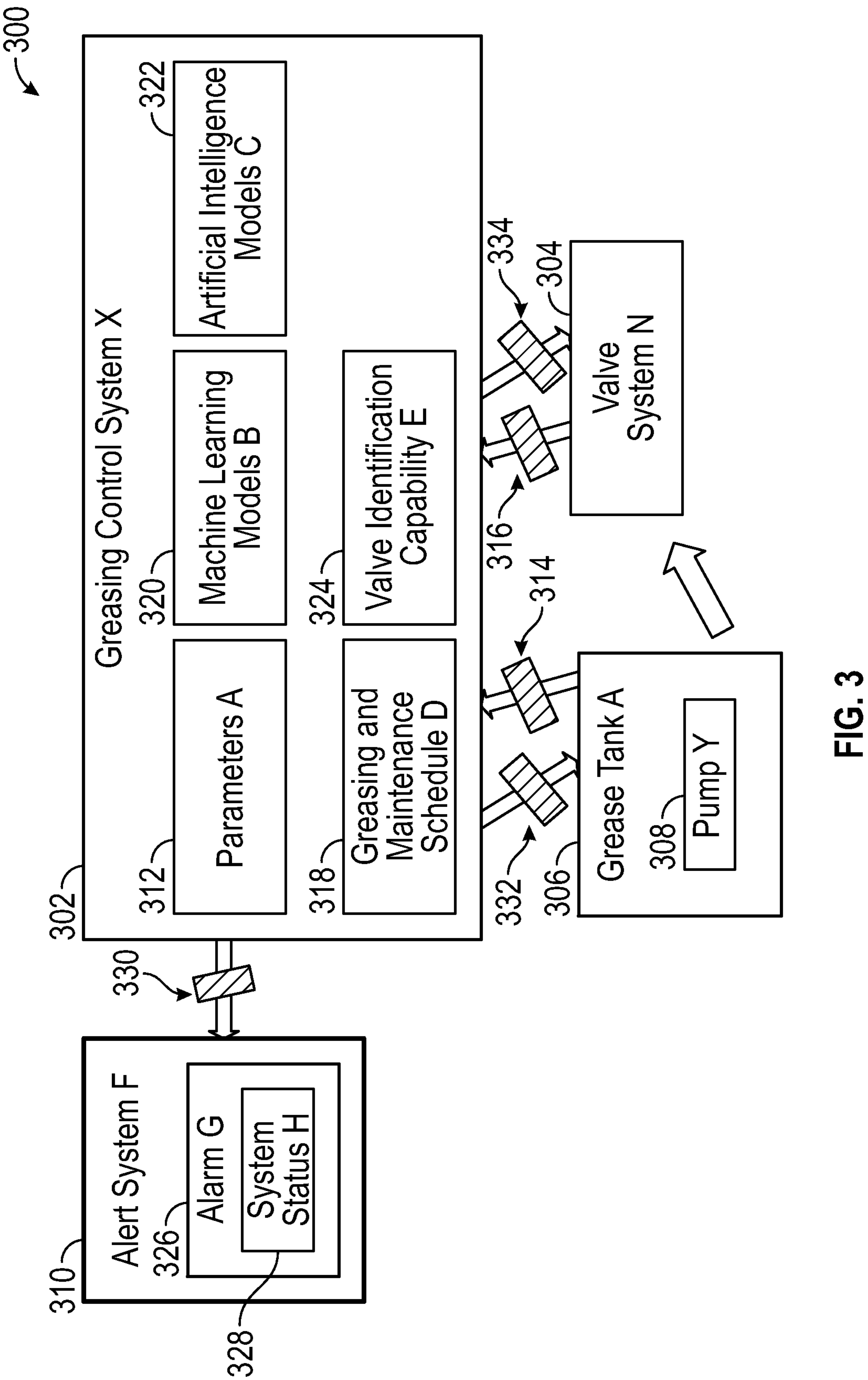
FIG. 3 shows a system in accordance with one or more embodiments.

FIG. 3 shows a shows a schematic diagram in accordance with one or more embodiments. In general, embodiments of the disclosure include a method for the permanent monitoring and control automation system (200) (e.g., permanent monitoring and control automation system X (300)). As shown in FIG. 2, a well system (e.g., well system (100)) may include various valves (e.g., valve system N (304)), a grease tank (e.g., grease tank A (306)), a pump (e.g., pump Y (308)) various network elements (not shown), a greasing control system (e.g., greasing control system X (302)), and/or an alert system (alert system F (310)). In some embodiments, various types of parameter data (e.g., parameters A (312)) are collected through communication (e.g., communication Z (314) and communication ZZ (316)) over the valve system, pump, and grease tank. Likewise, the greasing control system may also predict a greasing and maintenance schedule (e.g., greasing and maintenance schedule D (318)) regarding one or more valves in the valve system, one or more grease tanks, and one or more pumps in the well system. The greasing and maintenance schedule may be predicted by inputting parameter data such as grease volume, valve greasing status, and valve operational efficiency status into an artificial intelligence model (e.g., artificial intelligence model C (322)) using a machine-learning model (e.g., machine-learning models B (320)) and determining pumping rate, pumping volume, and pumping time schedule.

Likewise, the greasing control system may also determine a valve identification capability (e.g., valve identification capability E (324)) regarding one or more valves throughout the valve system. The valve identification capability may be determined by identifying valve location, incident type, and operational efficiency status. In some embodiments, the greasing control system includes a computer system that is the same as or similar to that of computer system (502) described below in FIG. 5 and the accompanying description.

With respect to distributed control systems, a distributed control system may be a computer system for managing various processes at a facility using multiple control loops. As such, a distributed control system may include various autonomous controllers (such as remote terminal units (RTUs)) positioned at different locations throughout the facility to manage operations and monitor processes. Likewise, a distributed control system may include no single centralized computer for managing control loops and other operations. On the other hand, a SCADA system may include a control system that includes functionality for enabling monitoring and issuing of process commands through local control at a facility as well as remote control outside the facility. With respect to an RTU, an RTU may include hardware and/or software, such as a microprocessor, that connects sensors and/or actuators using network connections to perform various processes in the automation system.

Keeping with control systems, a control system may be coupled to facility equipment. Facility equipment may include various machinery such as one or more hardware components, that may be monitored using one or more sensors. Examples of hardware components coupled to a control system may include valves, grease tanks, and pumps among various other types of hardware components. Hardware components may also include various network elements or control elements for implementing control systems, such as switches, routers, hubs, PLCs, remote terminal units, user equipment, or any other technical components for performing specialized processes. Examples of sensors may include pressure sensors, flow rate sensors, temperature sensors, torque sensors, rotary switches, weight sensors, position sensors, microswitches, hydrophones, accelerometers, etc. A greasing control system and network elements may be computer systems similar to the computer system (502) described in FIG. 5 and the accompanying description.

In some embodiments, a greasing control system includes functionality for transmitting an alarm (e.g., (alarm G (326)) with a system status (e.g., system status H (328)) using an alert system (e.g., alert system F (310)) via a command (e.g., command X (330)). The alarm notifies a user of the system status to perform a maintenance operation. A maintenance operation may include replacing a valve, grease tank, or pump and/or fill the grease tank. A maintenance operation may also include adjusting the permanent monitoring and automated control system and any elements thereof.

In some embodiments, the greasing control system includes functionality for transmitting commands (e.g., command Y (332)) to one or more grease tanks and pumps to implement the greasing and maintenance schedule. For example, the greasing control system X (302) may transmit a network message over a machine-to-machine protocol to the grease tank A (306) and pump Y (308) to deliver grease to the valve system N (304). A command may be transmitted periodically, based on user input, or automatically based on changes in greasing and maintenance schedule, valve identification capability, pressure level, and system status. Likewise, the greasing control system includes functionality for transmitting commands (e.g., command YZ (334)) to the valve system to control any valve in the valve system based on the valve identification capability and/or greasing and maintenance schedule. For example, if a leak is detected or deviation in pressure, the greasing control system shuts down a valve in the valve system.

Continuing with FIG. 3, a greasing control system (e.g., a greasing control system X (302)) may include hardware and/or software with functionality for storing and/or using one or more machine-learning models (e.g., machine-learning models B (320)) to produce a greasing and maintenance schedule (e.g., by inputting parameter data to provide a pumping rate, volume, and time schedule for the grease tank, pump, and valve system). The greasing control system pumps, via a pump (e.g., pump Y (308)), grease from a grease tank (e.g., grease tank A (306)) to a valve system (e.g., valve system N (304)).

Machine learning (ML), broadly defined, is the extraction of patterns and insights from data. The phrases "artificial intelligence," "machine learning," "deep learning," and "pattern recognition" are often convoluted, interchanged, and used synonymously throughout the literature. This ambiguity arises because the field of "extracting patterns and insights from data" was developed simultaneously and disjointedly among a number of classical arts like mathematics, statistics, and computer science. For consistency, the term machine learning, or machine-learned, will be adopted herein. However, one skilled in the art will recognize that the concepts and methods detailed hereafter are not limited by this choice of nomenclature.

Machine-learned model types may include, but are not limited to, generalized linear models, Bayesian regression, support vector machines, decision trees, random forests, and deep models such as neural networks, convolutional neural networks, and recurrent neural networks. Machine-learned model types, whether they are considered deep or not, are usually associated with additional "hyperparameters" that further describe the model. For example, hyperparameters providing further detail about a neural network may include, but are not limited to, the number of layers in the neural network, choice of activation functions, inclusion of batch normalization layers, and regularization strength. Commonly, in the literature, the selection of hyperparameters surrounding a machine-learned model is referred to as selecting the model "architecture." Once a machine-learned model type and hyperparameters have been selected, the machine-learned model is trained to perform a task. In some instances, hyperparameters of a model may be learned during a training process of the machine-learned model. In one or more embodiments, the machine-learned model type and training procedure may be categorized as a supervised learning process where instances of example inputs and labeled (or annotated) outputs are provided to the model during training. In other embodiments, the machine-learned model type and training procedure may be categorized as a semi-supervised learning process where only a portion of example inputs used in training have an associated labeled (or annotated) output. In these instances, unlabeled example inputs may be used during the training procedure. In one or more embodiments, multiple "rounds" of training may occur in order to determine an optimal set of hyperparameters and/or make use of newly labeled training data (e.g., in the case of semi-supervised learning). Once a machine-learned model is trained, it may be used in a production setting (also known as deployment of the machine-learned model). A brief description of various machine-learned models is provided below.

In a deep neural network, a layer of neurons may be trained on a predetermined list of features based on the previous network layer's output. Thus, as data progresses through the deep neural network, more complex features may be identified within the data by neurons in later layers. Likewise, a U-net model or other type of convolutional neural network model may include various convolutional layers, pooling layers, fully connected layers, and/or normalization layers to produce a particular type of output. Thus, convolution and pooling functions may be the activation functions within a convolutional neural network. In some embodiments, two or more different types of machine-learning models are integrated into a single machine-learning architecture, e.g., a machine-learning model may include K-nearest neighbor (k-NN) models and neural networks. In some embodiments, a reservoir simulator may generate augmented data or synthetic data to produce a large amount of interpreted data for training a particular model.

In some embodiments, various types of machine-learning algorithms (not shown) may be used to train the model, such as a backpropagation algorithm. In a backpropagation algorithm, gradients are computed for each hidden layer of a neural network in reverse from the layer closest to the output layer proceeding to the layer closest to the input layer. As such, a gradient may be calculated using the transpose of the weights of a respective hidden layer based on an error function (also called a "loss function"). The error function may be based on various criteria, such as mean squared error function, a similarity function, etc., where the error function may be used as a feedback mechanism for tuning weights in the machine-learning model.

In some embodiments, a machine-learning model is trained using multiple epochs. For example, an epoch may be an iteration of a model through a portion or all of a training dataset. As such, a single machine-learning epoch may correspond to a specific batch of training data, where the training data is divided into multiple batches for multiple epochs. Thus, a machine-learning model may be trained iteratively using epochs until the model achieves a predetermined criterion, such as predetermined level of prediction accuracy or training over a specific number of machine-learning epochs or iterations. Thus, better training of a model may lead to better predictions by a trained model.

With respect to support vector machines, a support vector machines may be a machine-learning model that is trained using a supervised machine-learning algorithm. For example, a support vector machine may provide a data analysis on various input features that implement a classification and regression analysis. More specifically, a support vector machine may determine a hyperplane that separates a dataset into different classes, and also determines various points (i.e., support vectors) that lie closest to different classes. Additionally, a support vector machine may use one or more kernel functions to transform data into a desired form for further processing. The term "Kernel" may refer to a set of mathematical functions that provide the window to manipulate the input data. In other words, a kernel function may transform a training set of data so that a non-linear decision surface is able to transform to a linear equation into a higher number of dimension spaces. Examples of kernel functions may include gaussian kernel functions, gaussian kernel radial basis functions (RBFs), sigmoid kernel functions, polynomial kernel functions, and linear kernel functions.

With respect to artificial neural networks, for example, an artificial neural network may include one or more hidden layers, where a hidden layer includes one or more neurons. A neuron may be a modelling node or object that is loosely patterned on a neuron of the human brain. In particular, a neuron may combine data inputs with a set of coefficients, i.e., a set of network weights for adjusting the data inputs. These network weights may amplify or reduce the value of a particular data input, thereby assigning an amount of significance to various data inputs for a task being modeled. Through machine learning, a neural network may determine which data inputs should receive greater priority in determining one or more specified outputs of the artificial neural network. Likewise, these weighted data inputs may be summed such that this sum is communicated through a neuron's activation function to other hidden layers within the artificial neural network. As such, the activation function may determine whether and to what extent an output of a neuron progresses to other neurons where the output may be weighted again for use as an input to the next hidden layer.

Turning to recurrent neural networks, a recurrent neural network (RNN) may perform a particular task repeatedly for multiple data elements in an input sequence (e.g., a sequence of temperature values or flow rate values), with the output of the recurrent neural network being dependent on past computations. As such, a recurrent neural network may operate with a memory or hidden cell state, which provides information for use by the current cell computation with respect to the current data input. For example, a recurrent neural network may resemble a chain-like structure of RNN cells, where different types of recurrent neural networks may have different types of repeating RNN cells. Likewise, the input sequence may be time-series data, where hidden cell states may have different values at different time steps during a prediction or training operation. For example, where a deep neural network may use different parameters at each hidden layer, a recurrent neural network may have common parameters in an RNN cell, which may be performed across multiple time steps. To train a recurrent neural network, a supervised learning algorithm, such as a backpropagation algorithm, may also be used. In some embodiments, the backpropagation algorithm is a backpropagation through time (BPTT) algorithm. Likewise, a BPTT algorithm may determine gradients to update various hidden layers and neurons within a recurrent neural network in a similar manner as used to train various deep neural networks.

Embodiments are contemplated with different types of RNNs. For example, classic RNNs, long short-term memory (LSTM) networks, a gated recurrent unit (GRU), a stacked LSTM that includes multiple hidden LSTM layers (i.e., each LSTM layer includes multiple RNN cells), recurrent neural networks with attention (i.e., the machine-learning model may focus attention on specific elements in an input sequence), bidirectional recurrent neural networks (e.g., a machine-learning model that may be trained in both time directions simultaneously, with separate hidden layers, such as forward layers and backward layers), as well as multidimensional LSTM networks, graph recurrent neural networks, grid recurrent neural networks, etc. With regard to LSTM networks, an LSTM cell may include various output lines that carry vectors of information, e.g., from the output of one LSTM cell to the input of another LSTM cell. Thus, an LSTM cell may include multiple hidden layers as well as various pointwise operation units that perform computations such as vector addition.

In some embodiments, ensemble learning methods are used to produce a hybrid-model architecture. For example, an ensemble learning method may use multiple types of machine-learning models to obtain better predictive performance than available with a single machine-learning model. In some embodiments, for example, an ensemble architecture may combine multiple base models to produce a single machine-learning model. One example of an ensemble learning method is a BAGGing model (i.e., BAGGing refers to a model that performs Bootstrapping and Aggregation operations) that combines predictions from multiple neural networks to reduce the variance of a single trained neural network model. Another ensemble learning method includes a stacking method, which may involve fitting many different model types on the same data and using another machine-learning model to combine various predictions.

Turning to random forests, a random forest model may combine the output of multiple decision trees to reach a single predicted result. For example, a random forest algorithm is made up of a collection of decision trees, where training of the random forest model determines three main hyperparameters that include node size, the number of decision trees, and the number of input features being sampled. During training, a random forest model may allow different decision trees to randomly sample from a dataset with replacement (e.g., from a bootstrap sample) to produce multiple final decision trees in the trained model. For example, when multiple decision trees form an ensemble in the random forest model, this ensemble may determine more accurate predicted data, particularly when the individual trees are uncorrelated with each other. In some embodiments, a random forest model implements a software algorithm that is an extension of a bagging method. As, a random forest model may use both bagging and feature randomness to create an uncorrelated forest of decision trees. Feature randomness (also referred to as "feature bagging") may generate a random subset of input features. This random subject may thereby result in low correlation among decision trees in the random forest model. In a training operation for a random forest model, a training operation may search for decision trees that provide the best split to subset particular data, such as through a Classification and Regression Tree (CART) algorithm. Different metrics, such as information gain or mean square error (MSE), may be used to determine the quality of a data split.

Keeping with random forests, a random forest model may be a classifier that uses data having discrete labels or classes. Likewise, a random forest model may also be used as a random forest regressor to solve regression problems. Depending on the type of problem being addressed by the random forest model, how predicted data is determined may vary accordingly. For a regression task, the individual decision trees may be averaged in a predicted result. For a classification task, a majority vote (e.g., the most frequent categorical variable) may determine a predicted class. In a random forest regressor, the model may work with data having a numeric or continuous output, which cannot be defined by distinct classes.

Figure 4:
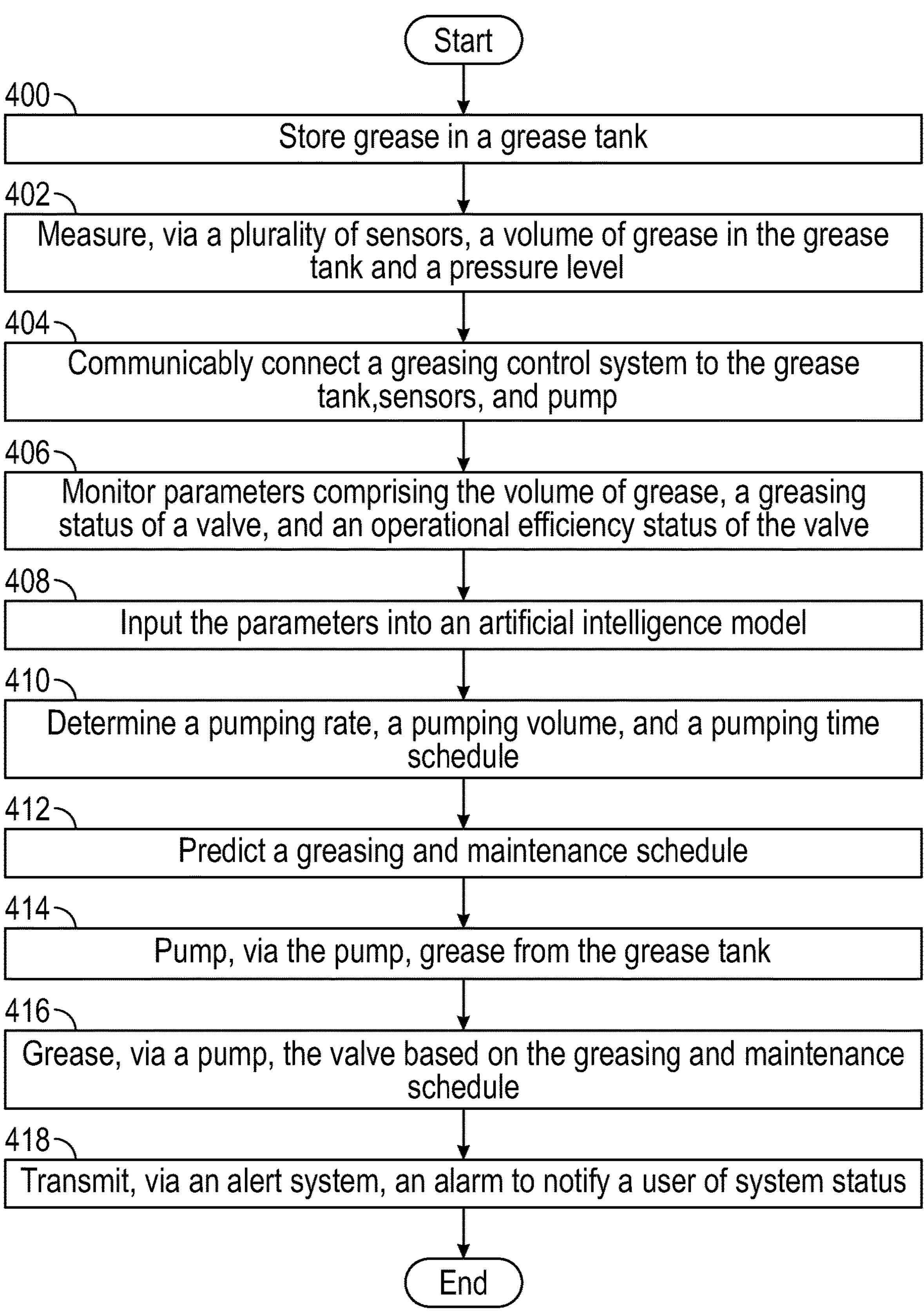
FIG. 4 shows a flowchart in accordance with one or more embodiments.

FIG. 4 shows a flowchart in accordance with one or more embodiments. Specifically, FIG. 4 describes a general method for a permanent monitoring and control automation system (e.g., permanent monitoring and control automation system (200)). The permanent monitoring and control automation system may be versatile to fit in a plurality of industries. One or more blocks in FIG. 4 may be performed by one or more components (e.g., greasing control system X (502)) as described in FIGS. 2 and 3. While various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 400, grease is stored in a grease tank. The grease tank includes a storage container for storing the grease. In Block 402, a volume of grease in the grease tank and a pressure level is measured via a plurality of sensors. An environmental sensor may be used to detect a leak in a valve on the well. In Block 404, a greasing control system is communicable connected to the grease tank, the sensors, and a pump. The greasing control system may include a computer processor connected to a remote terminal unit (RTU) and a supervisory control and data acquisition (SCADA). In Block 406, parameters including volume of grease, greasing status of the valve on the well, and operational efficiency status of the valve are monitored. The parameters are monitored by the computer processor in the greasing control system. A valve identification capability related to the valve may be identified using the computer processor. The valve identification capability includes a valve location, an incident type, and operational efficiency status.

In Block 408, the parameters are inputted into an artificial intelligence model, via the computer processor. In Block 410, a pumping rate, a pumping volume, and a pumping time schedule are determined. The pumping rate, volume, and time schedule are determined based, at least in part, on the parameters. In Block 412, a greasing and maintenance schedule is predicted. The greasing and maintenance schedule is predicted by using the computer processor and the artificial intelligence model. The artificial intelligence model may include a machine-learning model. In Block 414, grease from the grease tank is pumped via the pump. The grease is pumped based, at least in part, on the greasing and maintenance schedule. The greasing and maintenance schedule includes the pre-set value of the pressure level. In Block 416, a valve is greased at a pre-set value of the pressure level via a pump. One or more Christmas tree valves and/or a wellhead valves may be greased.

In Block 418, an alarm to notify a user of system status is transmitted, via an alert system. System status includes low grease level on the valve, an operational status, an alert type, a system malfunction, and a grease tank low level. A maintenance operation may be performed on the permanent monitoring and control automation system and any elements thereof based on the system status. The maintenance operation may include replacing or fixing a valve, pump, grease tank, and/or etc. The maintenance operation may include filling the grease tank with grease. An alert may be transmitted, via the alert system, to the greasing control system related to a greasing time deviation or a greasing volume deviation. User engagement may be emphasized via a community engagement platform integrated with the greasing control system. Data logging and traceability by blockchain integration may be secured with the greasing control system. The greasing control system may be maintained and troubleshooted using an augmented reality support (ARS) integrated in the greasing control system.

Embodiments may be implemented on a computer system. FIG. 5 is a block diagram of a computer system (502) used to provide computational functionalities associated with described algorithms, methods, functions, processes, flows, and procedures as described in the instant disclosure, according to an implementation. The illustrated computer (502) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (502) may include a computer that includes an input device, such as a keypad, keyboard, touch screen, or other device that can accept user information, and an output device that conveys information associated with the operation of the computer (502), including digital data, visual, or audio information (or a combination of information), or a GUI.

The computer (502) can serve in a role as a client, network component, a server, a database or other persistency, or any other component (or a combination of roles) of a computer system for performing the subject matter described in the instant disclosure. The illustrated computer (502) is communicably coupled with a network (530). In some implementations, one or more components of the computer (502) may be configured to operate within environments, including cloud-computing-based, local, global, or other environment (or a combination of environments).

At a high level, the computer (502) is an electronic computing device operable to receive, transmit, process, store, or manage data and information associated with the described subject matter. According to some implementations, the computer (502) may also include or be communicably coupled with an application server, e-mail server, web server, caching server, streaming data server, business intelligence (BI) server, or other server (or a combination of servers).

The computer (502) can receive requests over network (530) from a client application (for example, executing on another computer (502)) and responding to the received requests by processing the said requests in an appropriate software application. In addition, requests may also be sent to the computer (502) from internal users (for example, from a command console or by other appropriate access method), external or third-parties, other automated applications, as well as any other appropriate entities, individuals, systems, or computers.

Each of the components of the computer (502) can communicate using a system bus (503). In some implementations, any or all of the components of the computer (502), both hardware or software (or a combination of hardware and software), may interface with each other or the interface (504) (or a combination of both) over the system bus (503) using an application programming interface (API) (512) or a service layer (513) (or a combination of the API (512) and service layer (513). The API (512) may include specifications for routines, data structures, and object classes. The API (512) may be either computer-language independent or dependent and refer to a complete interface, a single function, or even a set of APIs. The service layer (513) provides software services to the computer (502) or other components (whether or not illustrated) that are communicably coupled to the computer (502). The functionality of the computer (502) may be accessible for all service consumers using this service layer. Software services, such as those provided by the service layer (513), provide reusable, defined business functionalities through a defined interface. For example, the interface may be software written in JAVA, C++, or other suitable language providing data in extensible markup language (XML) format or other suitable format. While illustrated as an integrated component of the computer (502), alternative implementations may illustrate the API (512) or the service layer (513) as stand-alone components in relation to other components of the computer (502) or other components (whether or not illustrated) that are communicably coupled to the computer (502). Moreover, any or all parts of the API (512) or the service layer (513) may be implemented as child or sub-modules of another software module, enterprise application, or hardware module without departing from the scope of this disclosure.

The computer (502) includes an interface (504). Although illustrated as a single interface (504) in FIG. 5, two or more interfaces (504) may be used according to particular needs, desires, or particular implementations of the computer (502). The interface (504) is used by the computer (502) for communicating with other systems in a distributed environment that are connected to the network (530). Generally, the interface (includes logic encoded in software or hardware (or a combination of software and hardware) and operable to communicate with the network (530). More specifically, the interface (504) may include software supporting one or more communication protocols associated with communications such that the network (530) or interface's hardware is operable to communicate physical signals within and outside of the illustrated computer (502).

The computer (502) includes at least one computer processor (505). Although illustrated as a single computer processor (505) in FIG. 5, two or more processors may be used according to particular needs, desires, or particular implementations of the computer (502). Generally, the computer processor (505) executes instructions and manipulates data to perform the operations of the computer (502) and any algorithms, methods, functions, processes, flows, and procedures as described in the instant disclosure.

The computer (502) also includes a memory (506) that holds data for the computer (502) or other components (or a combination of both) that can be connected to the network (530). For example, memory (506) can be a database storing data consistent with this disclosure. Although illustrated as a single memory (506) in FIG. 5, two or more memories may be used according to particular needs, desires, or particular implementations of the computer (502) and the described functionality. While memory (506) is illustrated as an integral component of the computer (502), in alternative implementations, memory (506) can be external to the computer (502).

The application (507) is an algorithmic software engine providing functionality according to particular needs, desires, or particular implementations of the computer (502), particularly with respect to functionality described in this disclosure. For example, application (507) can serve as one or more components, modules, applications, etc. Further, although illustrated as a single application (507), the application (507) may be implemented as multiple applications (507) on the computer (502). In addition, although illustrated as integral to the computer (502), in alternative implementations, the application (507) can be external to the computer (502).

There may be any number of computers (502) associated with, or external to, a computer system containing computer (502), each computer (502) communicating over network (530). Further, the term "client," "user," and other appropriate terminology may be used interchangeably as appropriate without departing from the scope of this disclosure. Moreover, this disclosure contemplates that many users may use one computer (502), or that one user may use multiple computers (502).

In some embodiments, the computer (502) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A permanent monitoring and control automation system for a well, the system comprising:

a grease tank comprising a storage container configured to hold grease;

a plurality of sensors configured to measure a volume of grease in the grease tank and a pressure level;

a pump configured to grease a valve on the well at a pre-set value of the pressure level using grease from the grease tank;

a greasing control system communicably connected to the grease tank, the plurality of sensors, and the pump, the greasing control system comprising a computer processor configured to:

monitor a plurality of parameters comprising a system status, the system status comprising the volume of grease, a low grease level on the valve, an operational status, an alert type, a system malfunction, and a grease tank low level;

input, via the computer processor, the plurality of parameters into an artificial intelligence model;

determine, via the computer processor, a pumping rate, a pumping volume, and a pumping time schedule based, at least in part, on the plurality of parameters;

determine, via the computer processor and the artificial intelligence model, a greasing and maintenance schedule comprising a a predicted valve issue and an updated pumping schedule based, at least in part, on the pumping rate, the pumping volume, and the pumping time schedule; and pump, via the pump, grease from the grease tank based, at least in part, on the greasing and maintenance schedule; and an alert system disposed in the greasing control system configured to transmit an alarm to notify a user of the system status.

2. The system of claim 1, further comprising:

an environmental monitoring sensor configured to detect a leak of the valve.

3. The system of claim 1, wherein the greasing control system is configured to identify, via the computer processor, a valve location and an incident type of the valve.

4. The system of claim 1, wherein the valve comprises a plurality of Christmas tree valves and a plurality of wellhead valves.

5. The system of claim 1, wherein the greasing control system comprises a blockchain integration configured to secure data logging and traceability.

6. The system of claim 1, wherein the greasing control system is integrated with an augmented reality support (ARS) comprising a remote assistant and an instruction module.

7. The system of claim 1, wherein the system status comprises a greasing time deviation or a greasing volume deviation.

8. The system of claim 1, wherein the artificial intelligence model comprises a machine-learning model.

9. A method for a permanent monitoring and control automation system for a well, the method comprising:

storing grease in a grease tank comprising a storage container;

measuring, via a plurality of sensors, a volume of grease in the grease tank and a pressure level;

communicably connecting a greasing control system to the grease tank, the plurality of sensors, and a pump, the greasing control system comprising a computer processor, wherein the greasing control system performs a method comprising:

monitoring, by the computer processor, a plurality of parameters comprising a system status, the system status comprising the volume of grease, a low grease level on the valve, an operational status, an alert type, a system malfunction, and a grease tank low level;

inputting, via the computer processor, the plurality of parameters into an artificial intelligence model;

determining, via the computer processor, a pumping rate, a pumping volume, and a pumping time schedule based, at least in part, on the plurality of parameters;

determining, via the computer processor and the artificial intelligence model, a greasing and maintenance schedule comprising a predicted valve issue and an updated pumping schedule based, at least in part, on the pumping rate, the pumping volume, and the pumping time schedule; and pumping, via the pump, grease from the grease tank based, at least in part, on the greasing and maintenance schedule comprising a pre-set value of the pressure level;

greasing, via the pump, the valve on the well based on the greasing and maintenance schedule using grease from the grease tank; and transmitting, via an alert system disposed in the greasing control system, an alarm to notify a user of the system status.

10. The method of claim 9, further comprising:

detecting, via an environmental monitoring sensor, a leak of the valve.

11. The method of claim 9, further comprising:

identifying, via the computer processor, a valve location and an incident type of the valve.

12. The method of claim 9, wherein greasing the valve comprises greasing a plurality of Christmas tree valves and a plurality of wellhead valves.

13. The method of claim 9, further comprising:

securing data logging and traceability by blockchain integration with the greasing control system.

14. The method of claim 9, further comprising:

integrating an augmented reality support (ARS) in the greasing control system comprising a remote assistant and an instruction module.

15. The method of claim 9, wherein the system status comprises a greasing deviation.

16. The method of claim 9, wherein the artificial intelligence model comprises a machine-learning model.

* * * * *